US011079240B2

(12) United States Patent
Tajeddin et al.

(10) Patent No.: US 11,079,240 B2
(45) Date of Patent: Aug. 3, 2021

(54) METHOD, SYSTEM AND APPARATUS FOR ADAPTIVE PARTICLE FILTER LOCALIZATION

(71) Applicant: Zebra Technologies Corporation, Lincolnshire, IL (US)

(72) Inventors: Sadegh Tajeddin, Mississauga (CA); Harsoveet Singh, Mississauga (CA); Jingxing Qian, Richmond Hill (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/213,553

(22) Filed: Dec. 7, 2018

(65) Prior Publication Data

US 2020/0182622 A1    Jun. 11, 2020

(51) Int. Cl.
*G01C 21/20* (2006.01)
*G06Q 50/28* (2012.01)
*G05D 1/02* (2020.01)

(52) U.S. Cl.
CPC ......... *G01C 21/206* (2013.01); *G05D 1/0231* (2013.01); *G05D 1/0274* (2013.01); *G06Q 50/28* (2013.01)

(58) Field of Classification Search
CPC .. G01C 21/165; G01C 21/206; G05D 1/0231; G05D 1/0274; G06Q 50/28
(Continued)

(56) References Cited

U.S. PATENT DOCUMENTS 5,209,712 A    5/1993  Ferri
5,214,615 A    5/1993  Bauer
(Continued)

FOREIGN PATENT DOCUMENTS

CA    2835830    11/2012
CA    3028156    1/2018
(Continued)

OTHER PUBLICATIONS

"Fair Billing with Automatic Dimensioning" pp. 1-4, undated, Copyright Mettler-Toledo International Inc.
(Continued)

*Primary Examiner* — Isaac G Smith

(57) ABSTRACT

A method for localization of a mobile automation apparatus includes, at a navigational controller: generating a set of candidate poses within an environmental map; updating the candidate poses according to motion data corresponding to movement of the mobile automation apparatus; receiving observational data collected at an actual pose of the mobile automation apparatus; generating (i) respective weights for the candidate poses, each weight indicating a likelihood that the corresponding candidate pose matches the actual pose, and (ii) a localization confidence level based on the weights; responsive to determining whether the localization confidence level exceeds a candidate pose resampling threshold: when the determination is affirmative, (i) increasing the candidate pose resampling threshold and (ii) generating a further set of candidate poses; and when the determination is negative, (i) decreasing the candidate pose resampling threshold without generating the further set; and repeating the updating, the receiving, the generating and the determining.

21 Claims, 11 Drawing Sheets

(58) Field of Classification Search
USPC .................................................. 701/409, 445
See application file for complete search history.

(56) References Cited

U.S. PATENT DOCUMENTS

| | | | |
|---|---|---|---|
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | imagawa et al. |

(56) References Cited

U.S. PATENT DOCUMENTS

| | | |
|---|---|---|
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1* | 5/2014 | Schnittman ......... G05D 1/0227 700/253 |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |

(56) References Cited

U.S. PATENT DOCUMENTS

| | | |
|---|---|---|
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1* | 9/2016 | Petrovskaya ........ G06Q 50/01 345/633 |
| 2016/0260054 A1 | 9/2016 | High et al. |
| 2016/0271795 A1* | 9/2016 | Vicenti .............. G05D 1/0274 |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0178436 A1 | 6/2019 | Mao et al. |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1* | 12/2019 | Sawhney ........ G06K 9/00201 |
| 2020/0314333 A1 | 10/2020 | Liang et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |

(56) References Cited

FOREIGN PATENT DOCUMENTS

| WO | WO 99/23600 | 5/1999 |
|---|---|---|
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), pp. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pgs. 19.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion for International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.

(56) References Cited

OTHER PUBLICATIONS

Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, pp. 2214-2221.
Fan Zhang et al., "Parallax-tolerant Image Stitching", 2014 Computer Vision Foundation, pp. 4321-4328.

(56) References Cited

OTHER PUBLICATIONS

Kaimo Lin et al., "Seagull: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.

* cited by examiner

METHOD, SYSTEM AND APPARATUS FOR ADAPTIVE PARTICLE FILTER LOCALIZATION

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To travel within the environment, the mobile apparatus may be required to perform a localization function (e.g. to track a current location of the mobile apparatus within a map of the environment). Accurate localization may be complicated by various factors, including moving obstacles not represented in the above map, distortions in the map, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
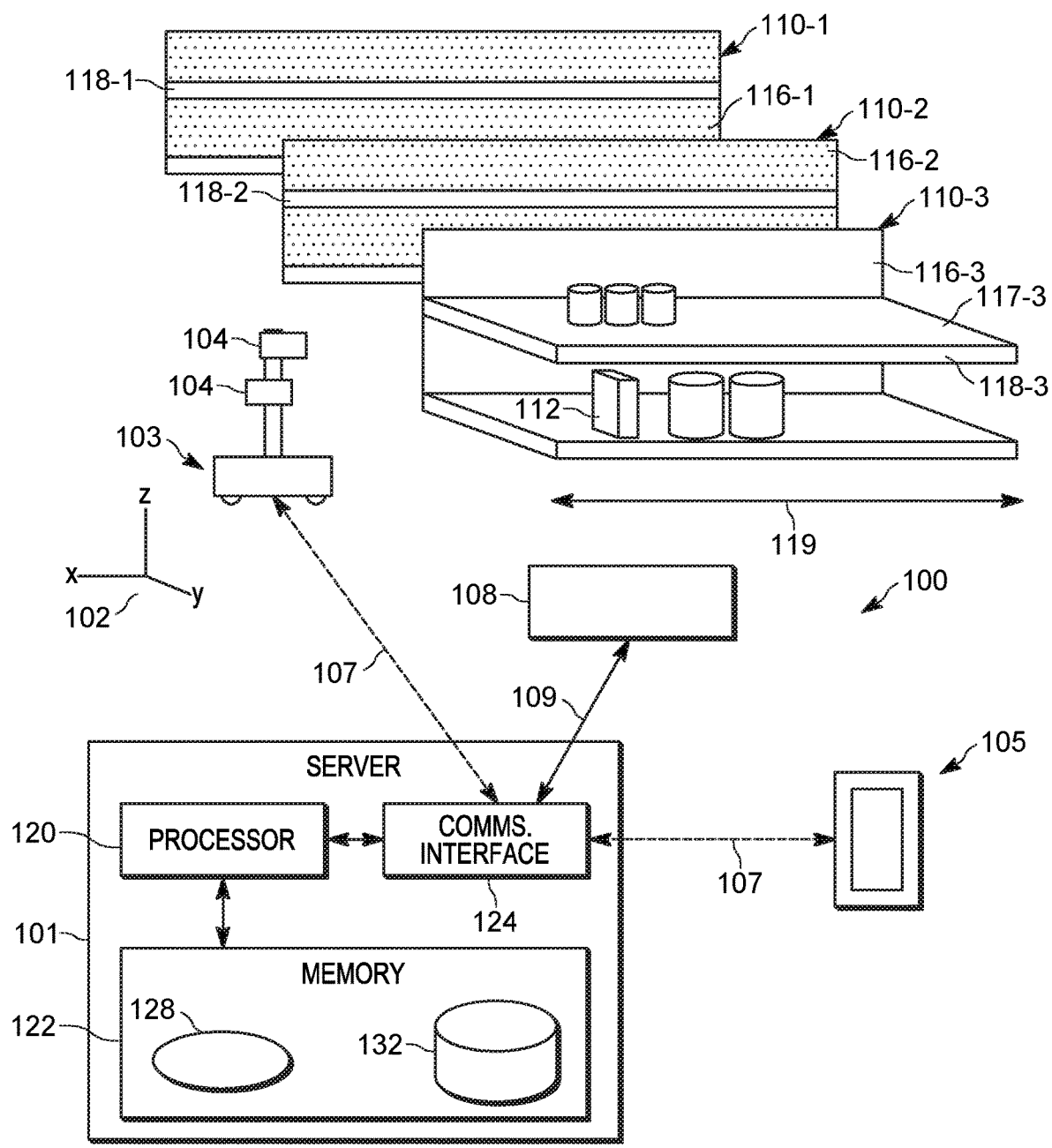
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for localization of a mobile automation apparatus, the method comprising, at a navigational controller: generating a set of candidate poses within an environmental map; updating the set of candidate poses according to motion data corresponding to movement of the mobile automation apparatus; receiving observational data collected at an actual pose of the mobile automation apparatus; generating (i) respective weights for the candidate poses, each weight indicating a likelihood that the corresponding candidate pose matches the actual pose, and (ii) a localization confidence level based on the weights; responsive to determining whether the localization confidence level exceeds a candidate pose resampling threshold: when the determination is affirmative, (i) increasing the candidate pose resampling threshold and (ii) generating a further set of candidate poses; and when the determination is negative, (i) decreasing the candidate pose resampling threshold without generating the further set; and repeating the updating, the receiving, the generating and the determining.

Additional examples disclosed herein are directed to a mobile automation apparatus, comprising a motion sensor; an observational sensor; and a navigational controller connected to the motion sensor and the observational sensor; the navigational controller configured to: generate a set of candidate poses within an environmental map; update the set of candidate poses according to motion data collected via the motion sensor; collect observational data corresponding to an actual pose of the mobile automation apparatus via the observational sensor; generate (i) respective weights for the candidate poses, each weight indicating a likelihood that the corresponding candidate pose matches the actual pose, and (ii) a localization confidence level based on the weights; determine whether the localization confidence level exceeds a candidate pose resampling threshold, and responsive to the determination: when the determination is affirmative, (i) increase the candidate pose resampling threshold and (ii) generate a further set of candidate poses; and when the determination is negative, (i) decrease the candidate pose resampling threshold without generating the further set; and repeat the update of the set of candidate poses, the collection of observation data, the generation of the weights and the localization confidence level, and the determination.

Further examples disclosed herein are directed to a non-transitory computer-readable medium storing a plurality of computer-readable instructions executable by a navigational controller, wherein execution of the computer-readable instructions configures the navigational controller to: generate a set of candidate poses within an environmental map; update the set of candidate poses according to motion data collected via a motion sensor; collect observational data corresponding to an actual pose of the mobile automation apparatus via an observational sensor; generate (i) respective weights for the candidate poses, each weight indicating a likelihood that the corresponding candidate pose matches the actual pose, and (ii) a localization confidence level based on the weights; determine whether the localization confidence level exceeds a candidate pose resampling threshold, and responsive to the determination: when the determination is affirmative, (i) increase the candidate pose resampling threshold and (ii) generate a further set of candidate poses; and when the determination is negative, (i) decrease the candidate pose resampling threshold without generating the further set; and repeat the update of the set of candidate poses, the collection of observation data, the generation of the weights and the localization confidence level, and the determination.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The environment in which the system 100 is deployed may also be referred to herein generically as a facility.

The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. The apparatus 103, autonomously or in conjunction with the server 101, is configured to continuously determine its location within the environment, for example with respect to a map of the environment. The map may, for example, define the positions of obstacles such as the shelves 110 according to a frame of reference 102. The apparatus 103 may also be configured to update the map (e.g. via a simultaneous mapping and localization, or SLAM, process). As will be discussed in greater detail below, the apparatus 103 can be configured to employ a particle filter localization mechanism, such as a localization mechanism based on Monte Carlo Localization (MCL) to determine a current pose (i.e. a location and an orientation) of the apparatus 103 within the map (i.e. with respect to the frame of reference 102).

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, such as target locations at which to capture shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to controlling the apparatus 103 to navigate among the shelves 110 and capture data. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

Figure 2A:
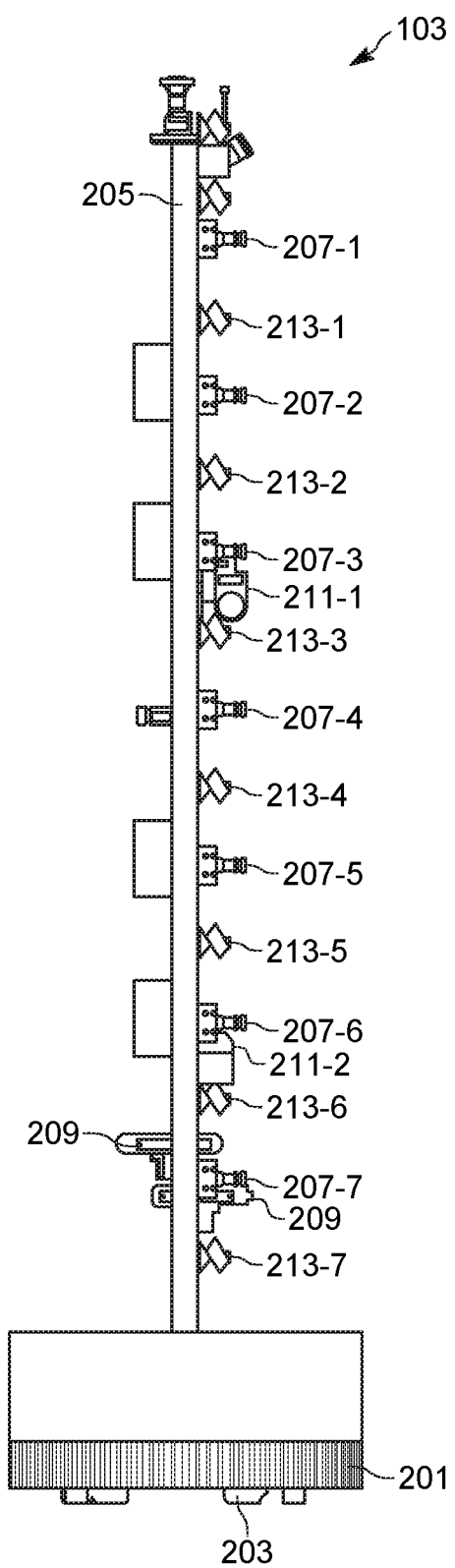
FIG. 2A depicts a mobile automation apparatus in the system of FIG. 1.
Figure 2B:
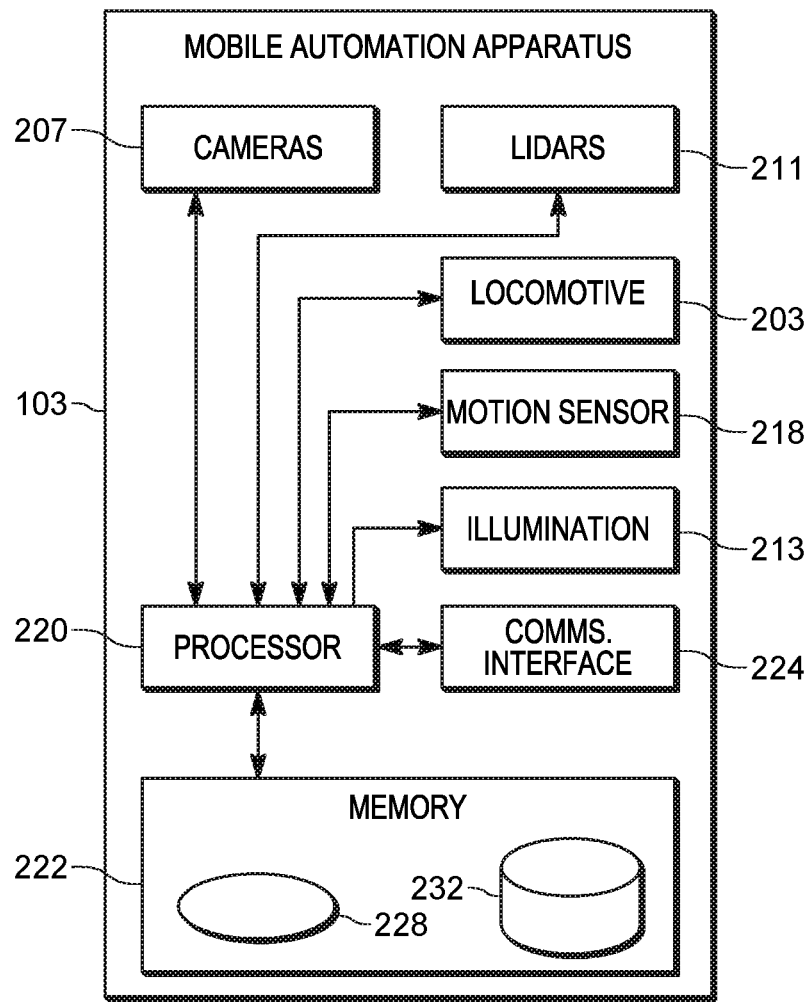
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 also includes a motion sensor 218, shown in FIG. 2B. The motion sensor 218 is configured to collect motion data defining movement of the apparatus 103, and can therefore include an inertial measurement unit (IMU) including a combination of accelerometer(s) and gyroscope(s). The motion sensor 218 can also include, in some embodiments, a wheel speed sensor integrated with the locomotive mechanism 203.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103, and in particular to localization of the apparatus 103 employing a particle filter mechanism. The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, the above-mentioned map representing the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

As will be apparent in the discussion below, in other examples, some or all of the processing performed by the apparatus 103 may be performed by the server 101, and some or all of the processing performed by the server 101 may be performed by the apparatus 103. That is, although in the illustrated example the application 228 resides in the mobile automation apparatus 103, in other embodiments the actions performed by some or all of the components of the apparatus 103 may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 107, as well as criticality level of the underlying instruction(s).

Figure 2C:
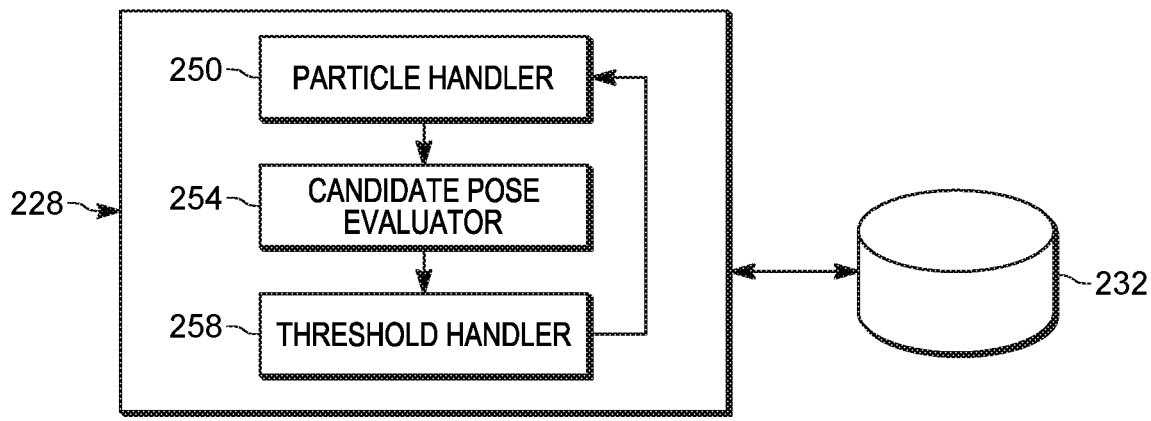
FIG. 2C is a block diagram of certain internal components of the apparatus of FIG. 1.

Turning now to FIG. 2C, before describing the actions taken by the apparatus 103 to perform localization, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a particle handler 250 configured to generate (also referred to as "resample") or update a set of candidate poses (which may also be referred to as particles) for the apparatus 103 within the above-mentioned map. The updating of candidate poses can be performed based on motion data, for example received from the motion sensor 218. The generation of candidate poses is performed based on inputs including weights (also referred to as likelihoods, as will be discussed below) assigned to a previous set of candidate poses by a candidate pose evaluator 254. The candidate pose evaluator 254 is configured to generate such weights based on observational data, such as lidar scans received from the lidar sensors 211. The application 228 also includes a resampling threshold handler 258, configured to maintain and update a threshold defining whether, based on the weights generated by the evaluator 254, to cause the particle handler 250 to generate (i.e. resample) a further set of particles, or to cause the particle handler 250 to update a current set of particles (e.g. according to motion data).

Figure 3:
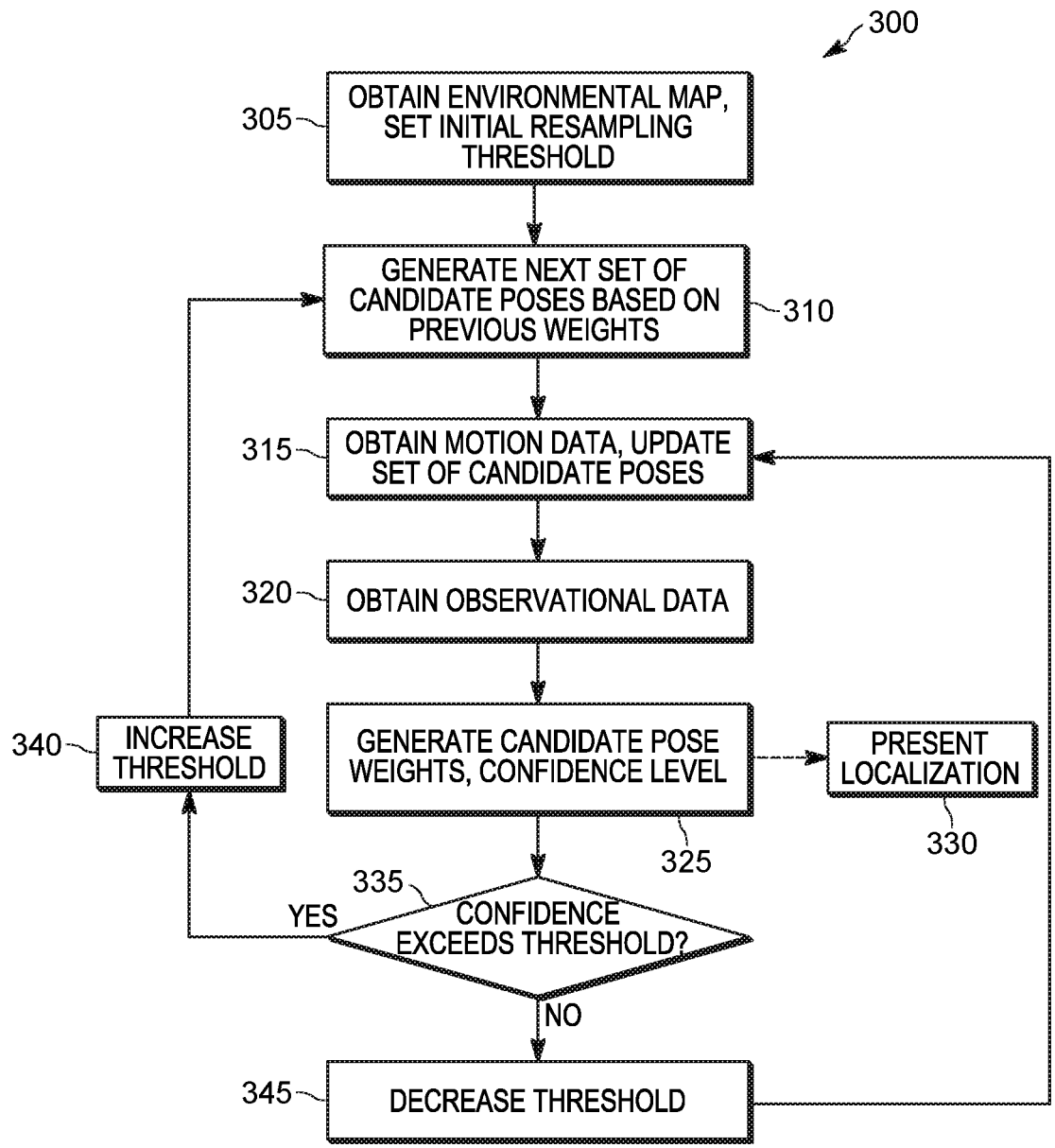
FIG. 3 is a flowchart of a method for localization of the mobile automation apparatus of FIG. 1.

The functionality of the application 228 will now be described in greater detail. In particular, the particle filter-based localization mechanism mentioned above will be described as performed by the apparatus 103. Turning to FIG. 3, a method 300 of localization is shown. The method 300 will be described in conjunction with its performance by the apparatus 103, with reference to the components illustrated in FIGS. 2B and 2C.

At block 305, the apparatus 103, and particularly the particle handler 250, is configured to obtain a map of the environment in which the apparatus 103 is deployed. The map can be obtained at block 305 by retrieval from the memory 222 (e.g. from the repository 232), where the map was previously stored. In other examples, the map can be obtained at block 305 by requesting the map from the server 101. Also at block 305, the apparatus 103 (and particularly the threshold handler 258) is configured to initialize a candidate pose resampling threshold. The candidate pose resampling threshold, as will be described in greater detail below, is employed to determine whether to resample a particle set used for localization, or to maintain a current particle set. The threshold is initialized at a preconfigured value (e.g. stored in the memory 222). In the present example the threshold is initialized at a value of ten percent (10%), although as will be apparent in the discussion below, a wide variety of other initial values may also be employed at block 305. The threshold also need not be expressed as a percentage in other implementations.

Figure 4A:
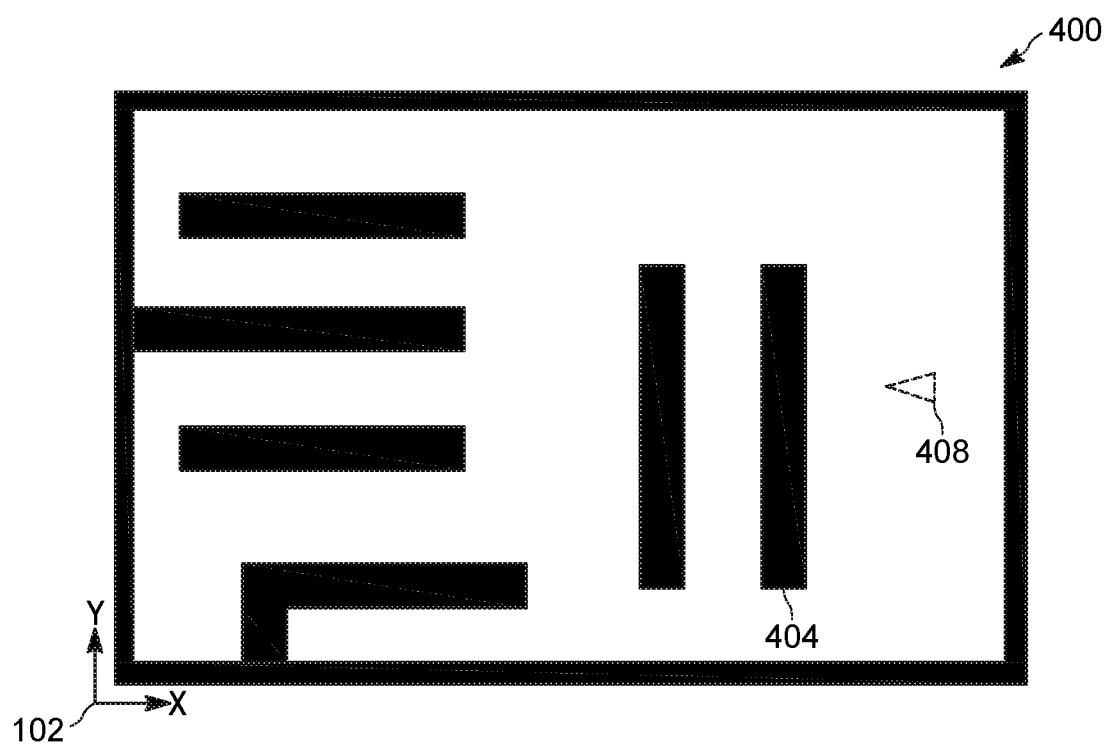
FIG. 4A illustrates a map employed in the performance of the method of FIG. 3

Turning brief to FIG. 4A, an example map 400 is shown as retrieved at block 305, depicting an overhead view of the environment in which the apparatus 103 is deployed. The map 400 defines, according to the frame of reference 102, the positions of a plurality of obstacles 404 in the environment. Also shown on the map in FIG. 4A is the actual pose 408 of the apparatus 103, although the actual pose 408 is not currently known to the apparatus 103. The pose 408 (and all other poses discussed herein) is characterized by a location within the map 400, e.g. indicated by the center of the triangle indicating the pose 408, as well as an orientation (i.e. a heading direction), indicated by the apex arrow extending from the circular element.

Returning to FIG. 3, at block 310 the apparatus 103 is configured to generate a set of candidate poses, also referred to as particles, within the map 400. The candidate poses are generated with a distribution throughout the map 400 (or a portion thereof, although in the examples discussed herein the entire map 400 will be employed) that is based on weights assigned to a previously generated set of candidate poses. The present performance of block 310 is the first performance of block 310, and therefore no weights for previous candidate poses are available. Such a scenario is equivalent to a previous set of particles having equal weights. Therefore, the set of candidate poses generated in the present performance of block 310 can be randomly distributed throughout the map 400. The particle handler 250 can be configured to generate a predefined number of candidate poses.

Figure 4B:
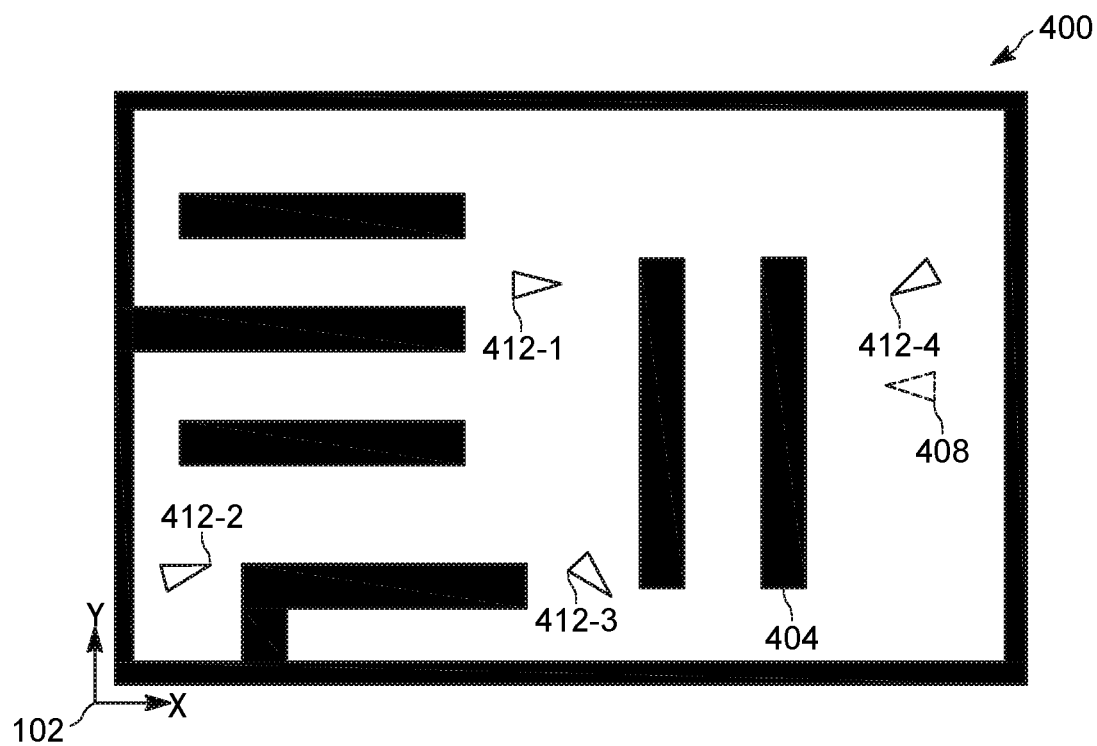
FIG. 4B illustrates an example performance of block 310 of the method of FIG. 3.

FIG. 4B illustrates the map 400 with a set of candidate poses overlaid thereon. In particular, example candidate poses 412-1, 412-2, 412-3 and 412-4 are illustrated. As will now be apparent, a greater number of candidate poses are typically generated at block 310 (e.g. one hundred poses; numbers of candidate poses both greater and smaller than 100 are also contemplated, with the actual number generated depending on the size of the map 400, the computational resources available to the apparatus 103, and the like), but only a subset are illustrated in FIG. 4B for clarity.

Figure 5A:
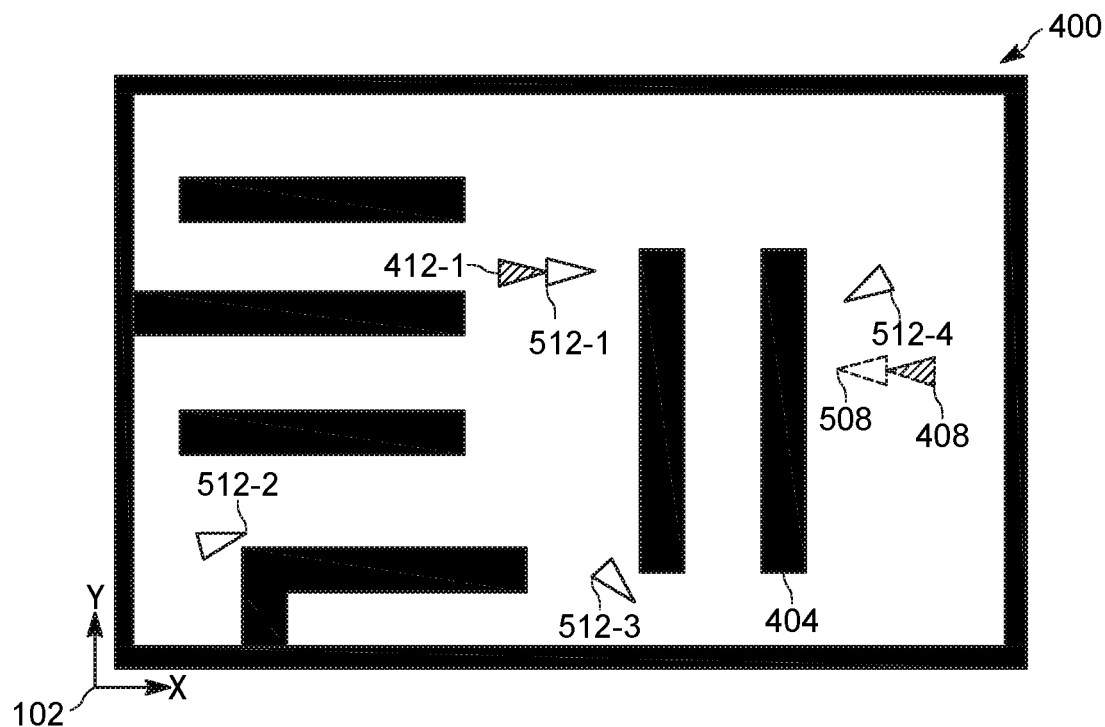
FIGS. 5A-5B illustrate an example performance of blocks 315-325 of the method of FIG. 3.

Referring again to FIG. 3, at block 315 the apparatus 103 is configured to obtain motion data corresponding to movement of the apparatus 103, and the particle handler 250 is configured to update the candidate poses 412 of the set generated at block 310 according to the motion data. In the present example, the motion data includes odometry obtained from the motion sensor 218 described above. The motion data indicates that the apparatus 103 has travelled a given distance in a "forward" direction. FIG. 5A illustrates the change in the actual pose of the apparatus 103. In particular, the previous actual pose 408 is shown, along with a current actual pose 508 following the above movement of the apparatus 103.

At block 315, the particle handler 250 is configured to update the poses 412 generated at block 310 to apply translations, rotations or the like based on the motion data. Thus, in the example shown in FIG. 5A, the candidate poses 412 are updated to candidate poses 512-1, 512-2, 512-3 and 512-4. For example, the candidate pose 512-1 corresponds to the candidate pose 412-1 of FIG. 4B (also illustrated for reference in FIG. 5A), translated "forward" by the same distance as shown between the poses 408 and 508. As will be apparent, the direction of travel reflected by the pose 512-1 is incorrect relative to the frame of reference 102 (it is the opposite direction from the actual direction of travel). The translations and/or rotations mentioned above can be applied to the candidate poses with some noise, to model noise in the motion data obtained from sensors of the apparatus 103.

At block 320, the apparatus 103 is configured to collect observational data corresponding to the actual pose 508. In the present example, the observational data includes lidar scan data collected with one or more of the lidar sensors 211. As will be apparent, in other embodiments the observational data can include other forms of data representing the surroundings of the apparatus 103, such as image data, in addition to or instead of lidar scan data. In the present example, the observational data includes a lidar scan having a field of view 516 as shown in FIG. 5B.

At block 325, the apparatus 103, and in particular the candidate pose evaluator 254, is configured to generate weights for each of the candidate poses 512. The weights may also be referred to as likelihoods. Each weight indicates a likelihood that the corresponding candidate pose 512 matches the actual pose 508 (i.e. that the candidate pose 512 correctly localizes the apparatus 103 within the map 400. The evaluator 254 is configured, at block 325, to generate expected observational data for each candidate pose 512, based on the pose 512 itself and on the map 400. In other words, the evaluator 254 is configured to determine what observational data would be expected at block 320, if the apparatus 103 were located at the candidate pose 512. For example, FIG. 5B illustrates a virtual field of view 520-1 associated with the candidate pose 512-1, illustrating the expected observational data that would be collected at block 320 if the apparatus 103 was located at the pose 512-1. The evaluator 254 is configured, for each candidate pose 512, to compare the expected observational data with the actual observational data from block 320, and to assign a weight to each candidate pose 512 based on the degree of similarity between expected and actual observational data.

Figure 5B:
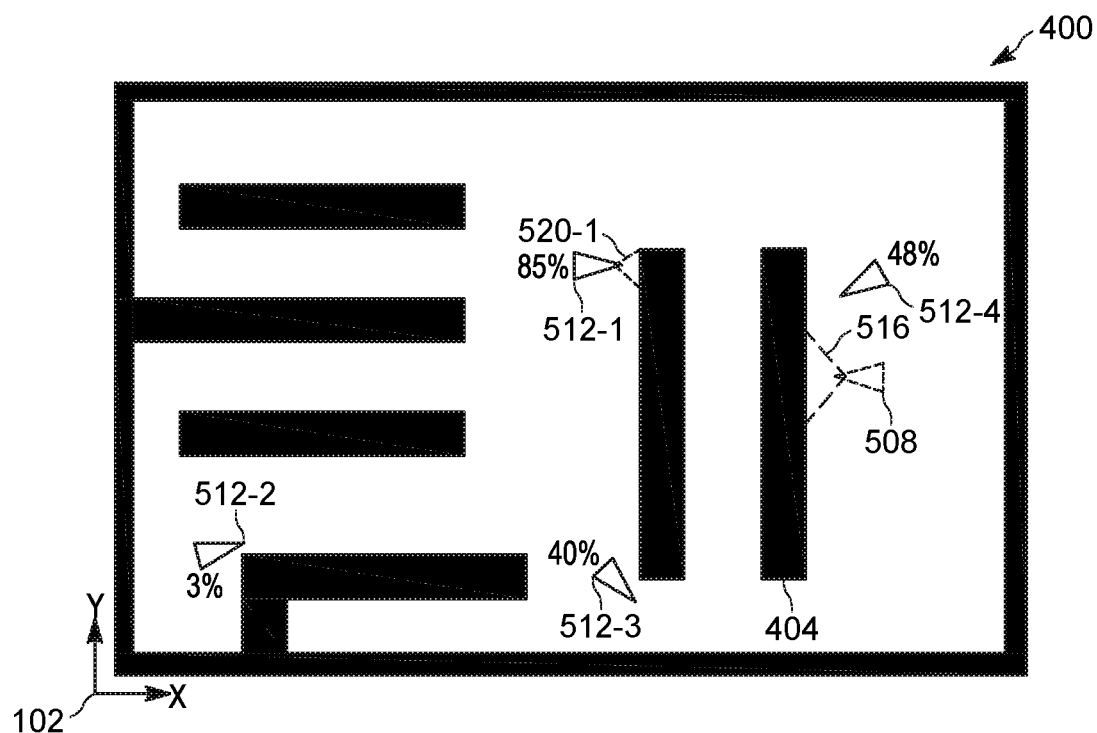

As is evident from FIG. 5B, certain candidate poses 512 (e.g. the candidate pose 512-2) yield expected observational data that matches the actual observational data poorly. The candidate pose 512-2 is therefore assigned a low weight (e.g. 3% in the present example). Repeating the same process for each candidate pose 512 yields the example weights shown in FIG. 5B. That is, the candidate pose 512-3 is assigned a weight of 40%, and the candidate pose 512-4 is assigned a weight of 48%. The candidate pose 512-1, as shown in FIG. 5B, is assigned a weight of 85%. Although the candidate pose 512-1 faces in the opposite direction from the actual pose 508 and faces towards a different obstacle 404 than the actual pose 508, the obstacles are assumed to be similar to each other, and the orientation of the actual pose 508 and the candidate pose 512-1 relative to the corresponding obstacles 404 are similar. Therefore the expected observational data in the field of view 520-1 is similar to the actual observational data.

Returning again to FIG. 3, at block 325 the apparatus 103 is also configured to generate a localization confidence level based on the weights discussed above. For example, the evaluator 254 can be configured to select a predefined number of the candidate poses 512 having the highest weights (e.g. in a set of 100 candidate poses, the 15 highest-weighted candidate poses), and generate an average of the selected weights. In other examples, the evaluator 254 may also apply a selection threshold to the above selection, for example selecting up to a predefined number of candidate poses whose weights are greater than 70%.

In the example illustrated in FIG. 5B, it is assumed that the evaluator simply selects the highest-weighted candidate pose 512 (i.e. the candidate pose 512-1) in the present example. The confidence level generated at block 325 for the present example performance of block 325 is therefore 85%. At block 330, the evaluator 254 can be configured to present a localization, for example to another component of the apparatus 103, the server 101, or the like. The localization presented at block 330 can be an average pose of the subset of selected candidate poses from which the confidence level is generated.

At block 335, the apparatus 103 (and in particular the threshold handler 258) is configured to determine whether the confidence level generated at block 325 exceeds the threshold initialized at block 305. In the present example, as noted earlier, the threshold was initialized at 10%, and the confidence level of 85% therefore exceeds the threshold.

The determination at block 335 is therefore affirmative, and performance of the method proceeds to block 340.

At block 340, the threshold handler 258 is configured to increase the threshold from the value initialized at block 305. In the present example, the threshold is increased to match the current localization confidence (e.g. 85%). In other examples, the threshold can be increased in predetermined steps, or by a dynamic step determined based on the difference between the confidence level and the current threshold. The increase of the threshold at block 340 indicates an expectation that further observations of the surroundings of the apparatus 103 are likely to improve the localization confidence of the apparatus 103, based on the affirmative determination at block 335.

Figure 6A:
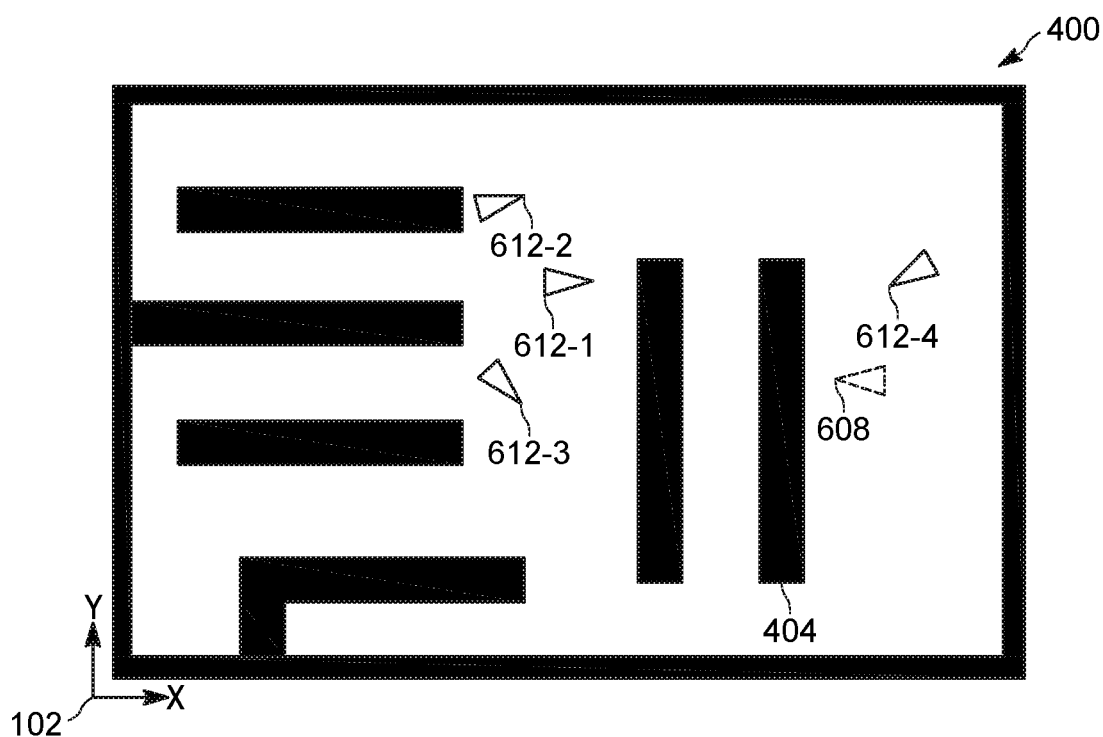
FIGS. 6A-6B illustrate a further example performance of blocks 310-325 of the method of FIG. 3.

Following the performance of block 340, the apparatus 103 is configured to generate a further set of candidate poses, based on the weights previously assigned to the candidate poses 512 at block 325. That is, the further set of candidate poses generated in this iteration of block 310 are distributed in the map 400 according to the weights from block 325. The further set of candidate poses are therefore biased towards the pose 512-1. FIG. 6A illustrates a further set of candidate poses 612-1, 612-2, 612-3 and 612-4 generated at block 310. As shown in FIG. 6A, the candidate poses 612 are biased towards the location of the candidate pose 512-1 within the map 400 (that is, three of the four candidate poses 612 are adjacent to the candidate pose 512-1).

Figure 6B:
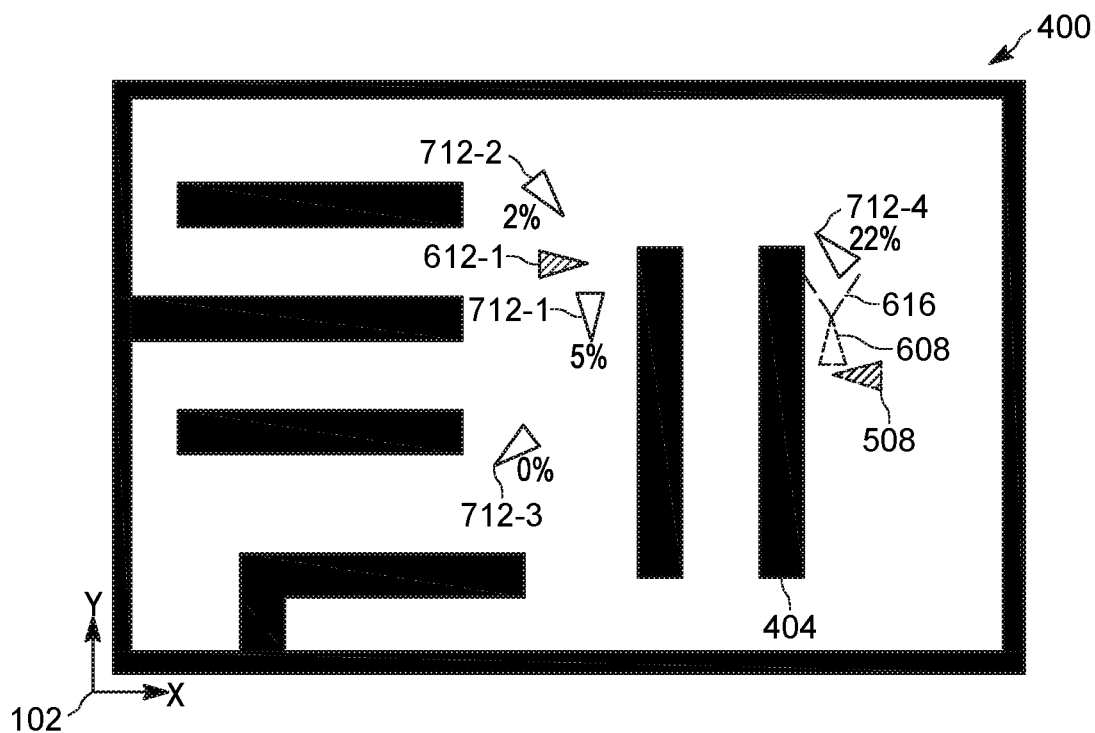

At block 315, further motion data indicates that the apparatus 103 has moved in the forward direction and turned to the "right" by an angle of 90 degrees, as shown in FIG. 6B, which illustrates an updated actual pose 608 relative to the previous actual pose 508. The candidate poses 612 are also updated at block 315, as shown in FIG. 6B, in which the candidate poses 612 are replaced with candidate poses 712-1, 712-2, 712-3 and 712-4 (the candidate pose 612-1 prior to updating is also shown for reference).

Figure 7A:
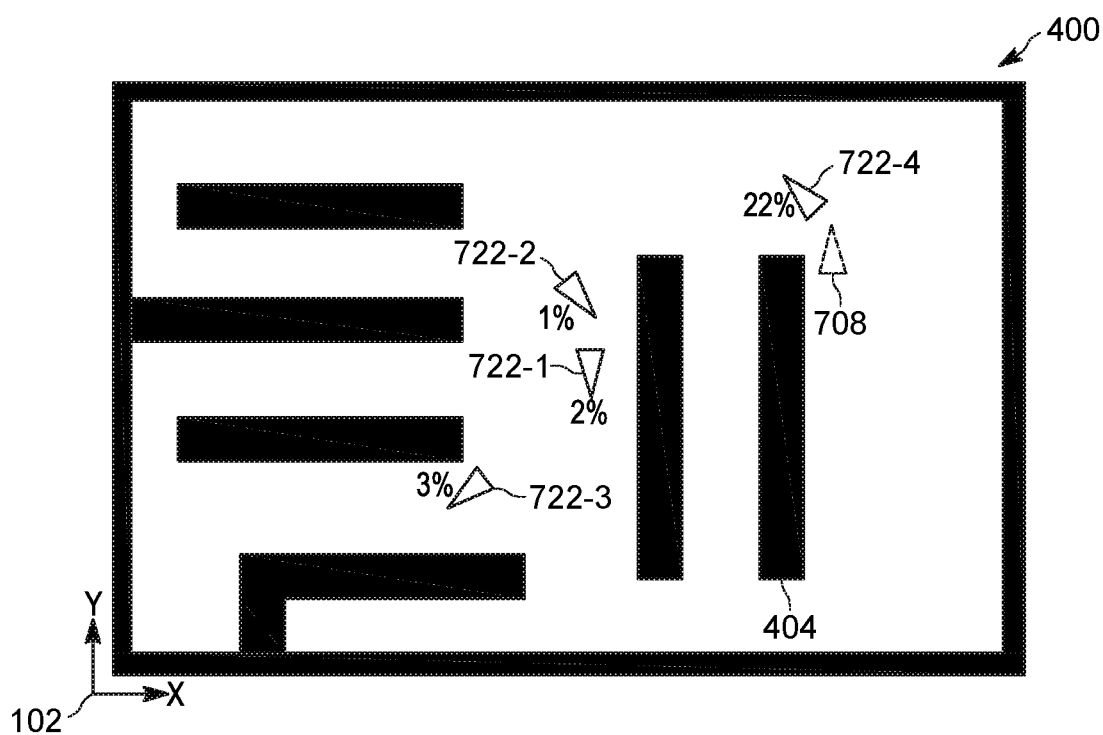
FIGS. 7A-7B illustrate additional performances of blocks 315-325 of the method of FIG. 3.
Figure 7B:
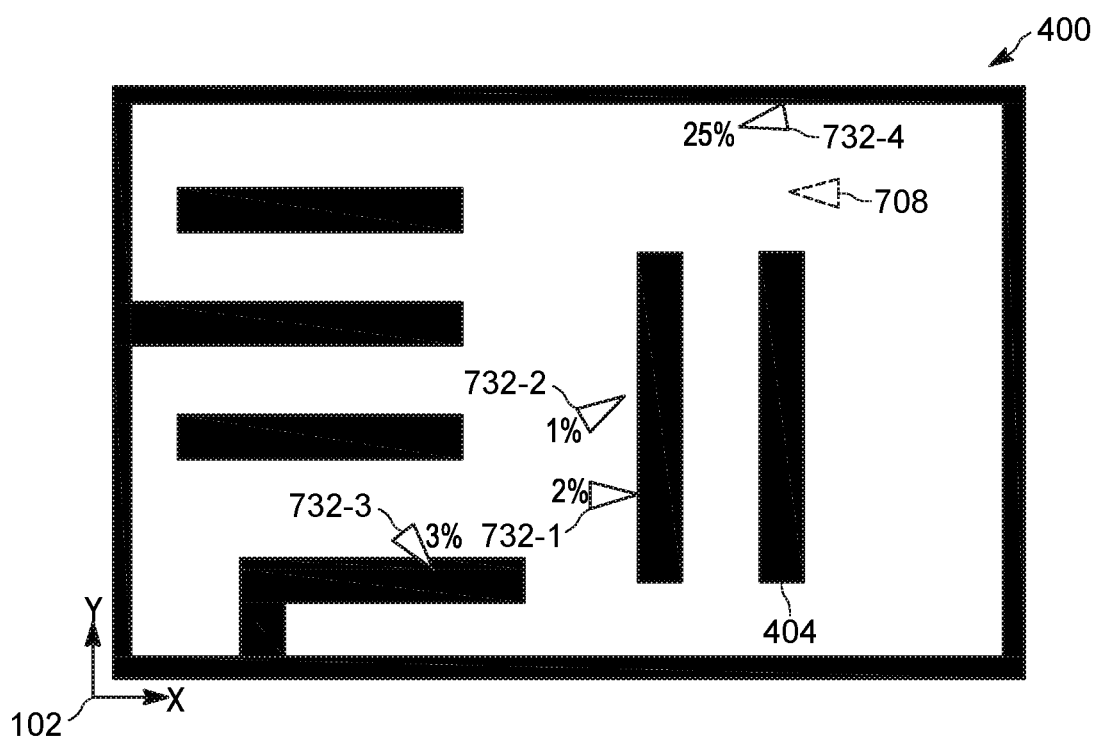

At a further performance of block 320, the apparatus 103 is configured to obtain observational data, depicting a field of view 616. As will now be apparent, the expected observational data corresponding to the candidate poses 712 are dissimilar to the actual observational data collected from the field of view 616. The candidate poses 712-1, 712-2, 712-3 and 712-4 are therefore assigned weights at block 325 as shown in FIG. 7B (respectively, of 5%, 2%, 0% and 22%). The confidence level at block 325 is therefore 5%, corresponding to the weight assigned to the candidate pose 712-1.

At block 335, therefore, the determination is negative, as the confidence level from block 325 does not exceed the current resampling threshold of 85%. The apparatus 103 is therefore configured, at block 345, to decrease the threshold. The threshold is decreased according to a predetermined step (e.g. 10% per performance of block 345). In other examples, the threshold can be decreased by a dynamic step determined according to the distance travelled by the apparatus 103 (as defined by the motion data received at block 315) since the previous threshold update, or on an elapsed time period since the previous threshold update (with greater distances or greater time periods leading to greater decreases). The decrease is independent of the difference between localization confidence and the previous threshold. The decrease of the threshold at block 345 indicates that based on the current observational data, the confidence of the apparatus 103 in the effectiveness of the current distribution of candidate poses is reduced (i.e. this distribution of candidate poses is considered less likely to yield accurate localization). In the present example, the threshold is assumed to be decreased form 85% to 60%.

Following the performance of block 345, the apparatus 103 is configured to return to block 315. Of particular note, following block 345 a new set of candidate poses is not generated. Instead, the previous set of candidate poses 712 is retained, and updated according to motion data collected at block 315. FIG. 7A illustrates further performances of block 315, 320 and 325, in which a change in the actual pose 708 is reflected in motion data obtained at block 315, and the candidate poses 712 are updated, appearing as candidate poses 722-1, 722-2, 722-3 and 722-4. As is apparent from FIG. 7A, the weights assigned to the updated candidate poses 722 at a further performance of block 325 remain below the threshold of 60%, and thus the threshold is reduced once again at block 340. For illustrative purposes, the threshold is assumed to be reduced to 20%.

FIG. 7B illustrates a further performance of blocks 315, 320 and 325, resulting in weights assigned to candidate poses 732-1, 732-2, 732-3 and 732-4 (which are updated versions of the candidate poses 722) of 2%, 1%, 3% and 25%, respectively. The confidence level generated at block 325 is therefore 25% (corresponding to the highest-weighted candidate pose 732). The determination at block 335 is therefore affirmative, because the confidence level of 25% exceeds the threshold of 20%. The threshold is therefore increased to 25% at block 340, and block 310 is repeated to generate a new set of candidate poses.

Figure 8A:
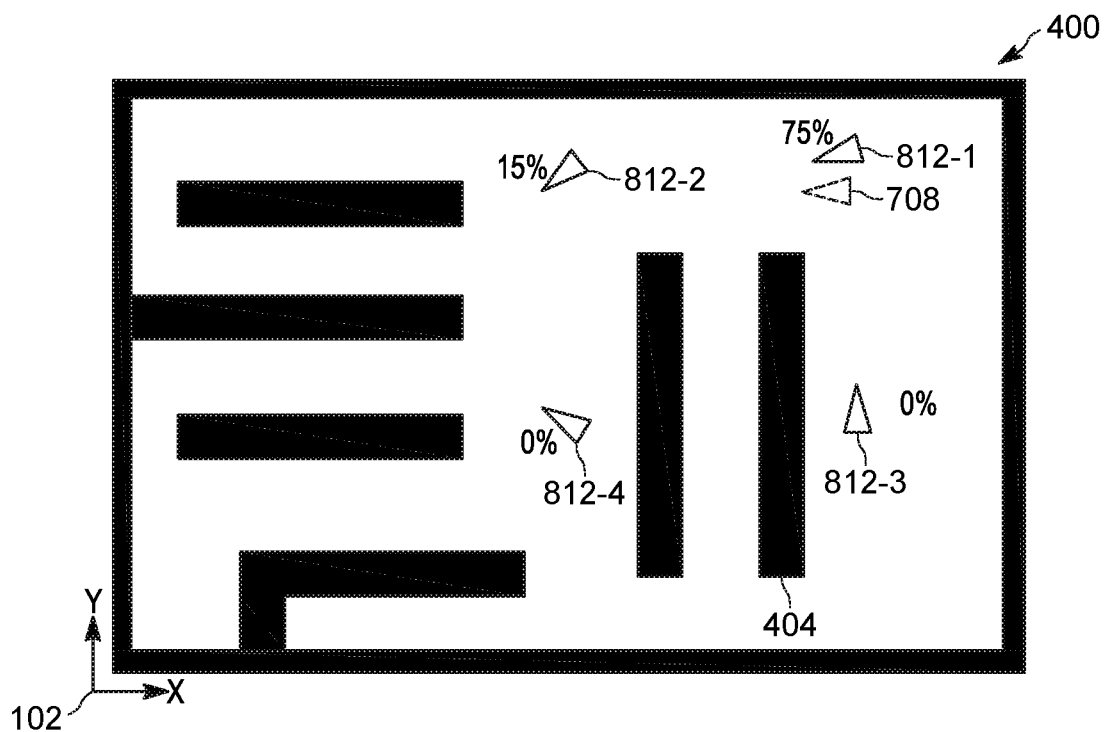
FIGS. 8A-8B illustrates further performances of blocks 310-325 of the method of FIG. 3

As shown in FIG. 8A, the new set of candidate poses 812-1, 812-2, 812-3 and 812-4 are biased towards the position of the candidate pose 732-4 shown in FIG. 7B (though such bias may be relatively weak, due to the low weight of the candidate pose 732-4). Following a further performance of blocks 320 and 325, the weights illustrated in FIG. 8A are generated. As will now be apparent, the poses 812 were not updated to reflect movement of the apparatus 103 as defined by motion data obtained at block 315. The motion data may, for example, indicate that the apparatus 103 has not moved since the generation of the candidate poses 812.

Figure 8B:
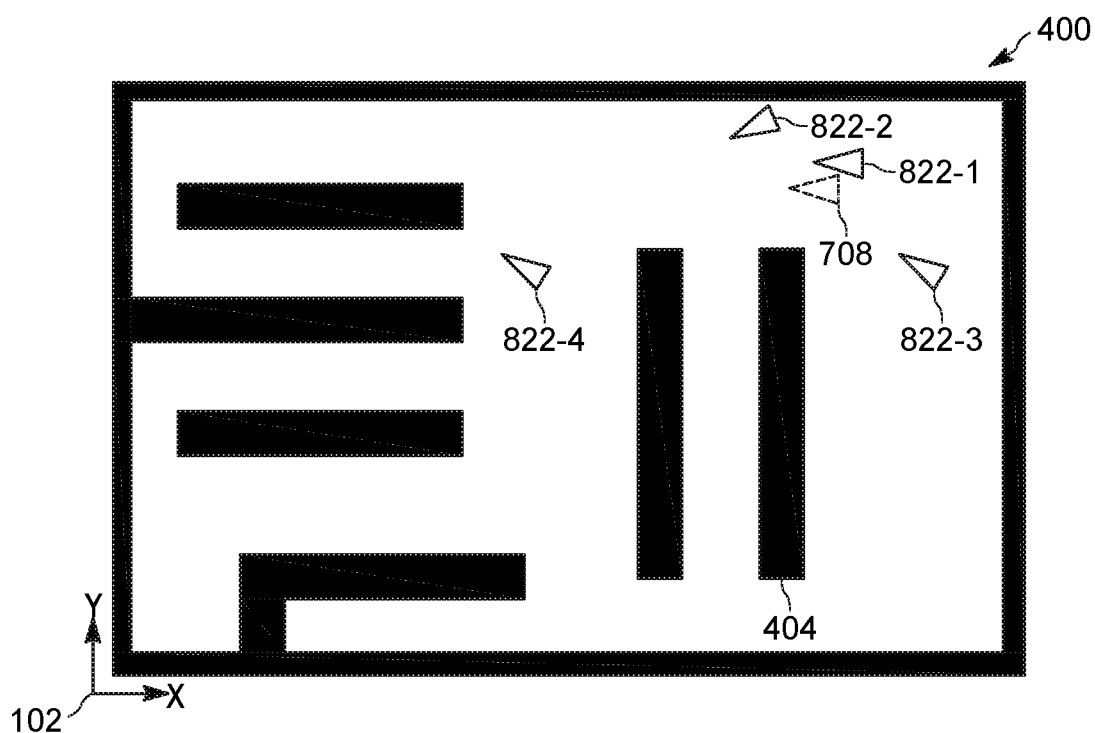

As seen in FIG. 8A, the weight generated for the candidate pose 812-1 is 75%, which exceeds the threshold of 25%. Employing the weight of 75% as the localization confidence level at block 325, the determination at block 335 is therefore affirmative, and at block 340 the threshold is increased to 75%, following which a further set of candidate poses 822-1, 822-2, 822-3 and 822-4 (shown in FIG. 8B) are generated at block 310, biased towards the position of the candidate pose 812-1.

Figure 9A:
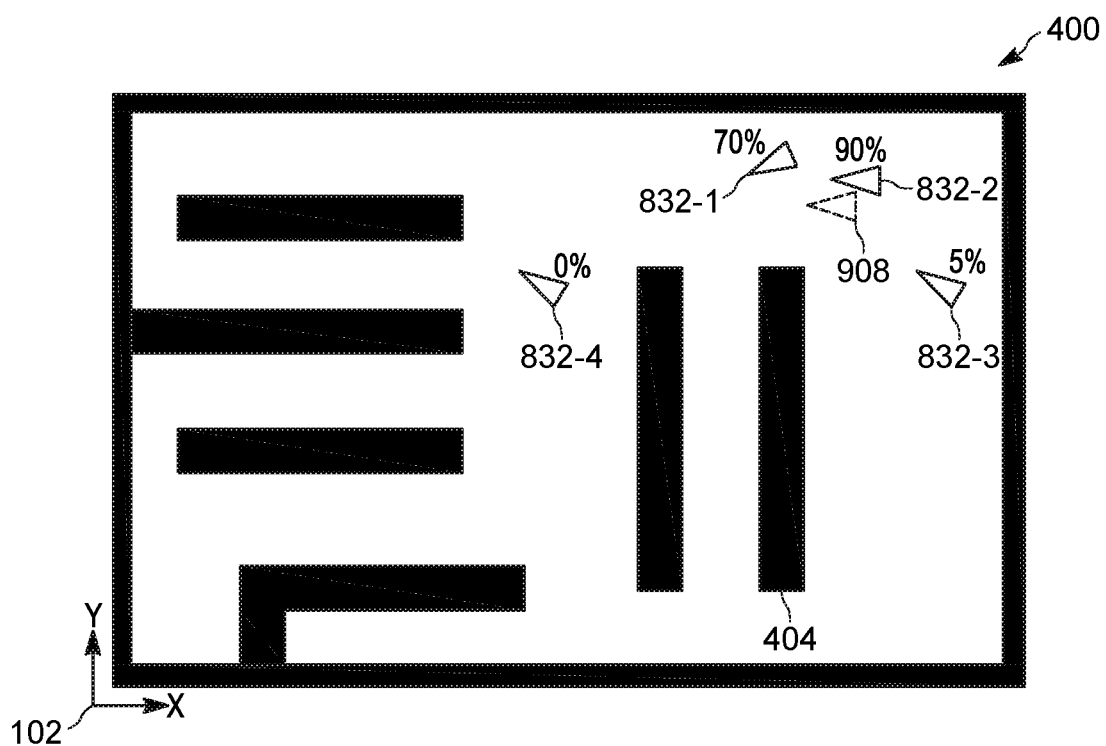
FIG. 9A illustrates a further performance of blocks 315-325 of the method of FIG. 3.
Figure 9B:
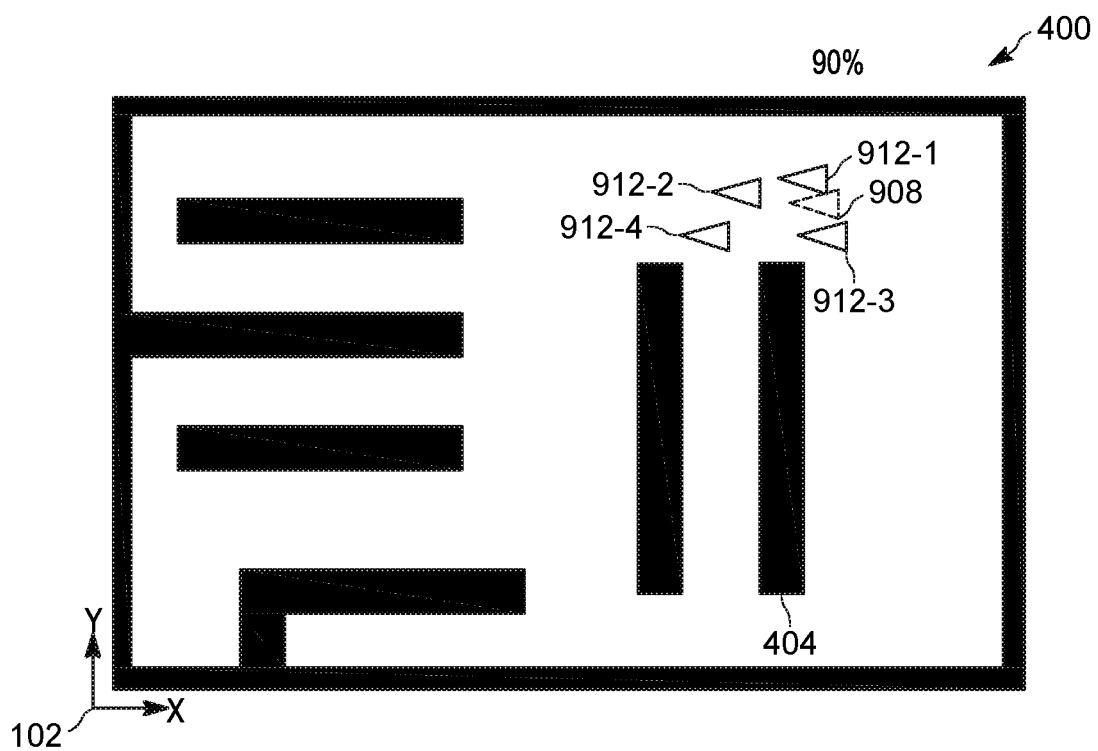
FIG. 9B illustrates a further example performance of blocks 310-325 of the method of FIG. 3.

FIG. 9A illustrates a further performance of blocks 315, 320 and 325. Specifically, motion data obtained at block 315 indicates movement of the apparatus 103 (reflected as an actual pose 908). The candidate poses 822 are therefore updated to the candidate poses 832-1, 832-2, 832-3 and 832-4 as shown in FIG. 9A, and the illustrated weights are generated at block 325. The confidence level determined at block 325 is therefore 90%, and the determination at block 335 is affirmative (as the confidence level, of 90% exceeds the threshold of 75%). The threshold is therefore increased to 90%, and yet another set of candidate poses is therefore generated in a further performance of block 310, illustrated in FIG. 9B as candidate poses 912-1, 912-2, 912-3 and 912-4.

Figure 10A:
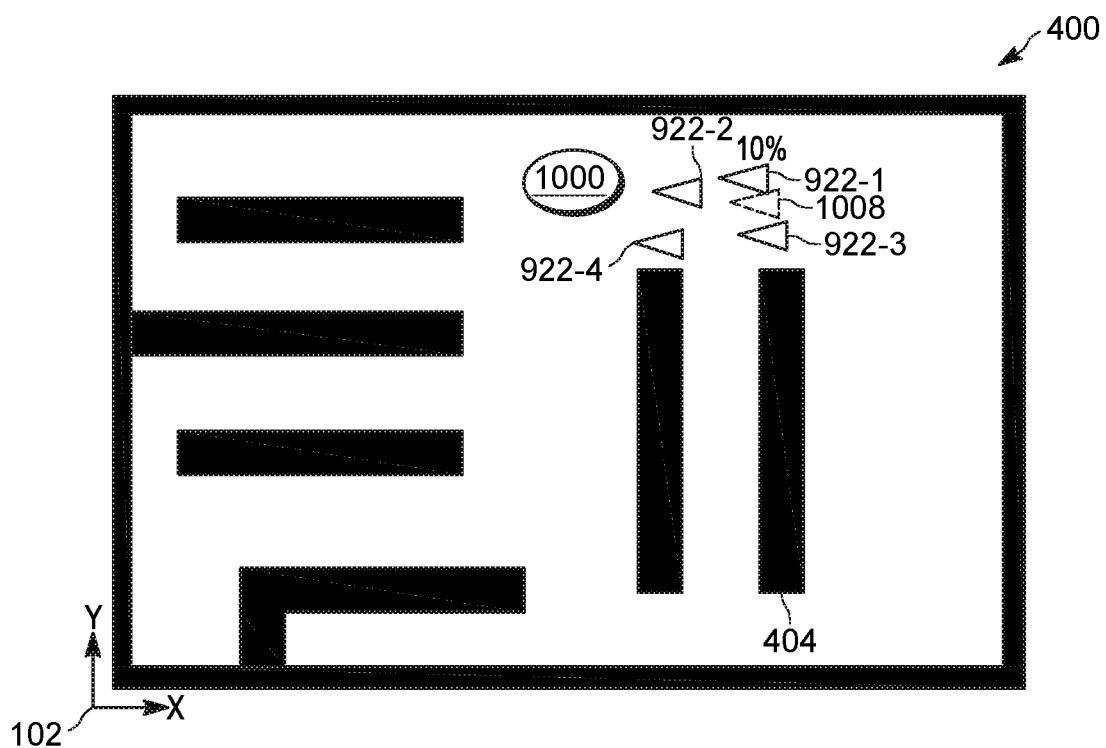
FIGS. 10A-10B illustrate further performances of blocks 315-325 of the method of FIG. 3.

FIG. 10A illustrates a further performance of block 315, updating the candidate poses 912 to candidate poses 922-1, 922-2, 922-3 and 922-4 according to motion data indicating movement of the apparatus 103 (to an actual pose 1008). FIG. 10A also illustrates an obstacle 1000, which is assumed not to be represented in the map 400. The obstacle 1000 may be, for example, a moving obstacle such as a person, vehicle or the like. At block 320, the observational data collected from the actual pose 1008 therefore indicates the presence of the obstacle 1000, whereas the expected observational data generated from the map 400 for each of the candidate poses 922 does not indicate the presence of the obstacle 1000. The weights generated for the candidate poses 922 are therefore low (e.g. an example weight of 10% for the candidate pose 922-1 is shown) despite the close proximity of the poses 922 to the actual pose 1008 (i.e. despite the accuracy of the candidate poses 922). The determination at block 335 is therefore negative, and the threshold is decreased (e.g. from 90% to 75%) at block 345. However, the candidate poses 922 are retained.

Figure 10B:
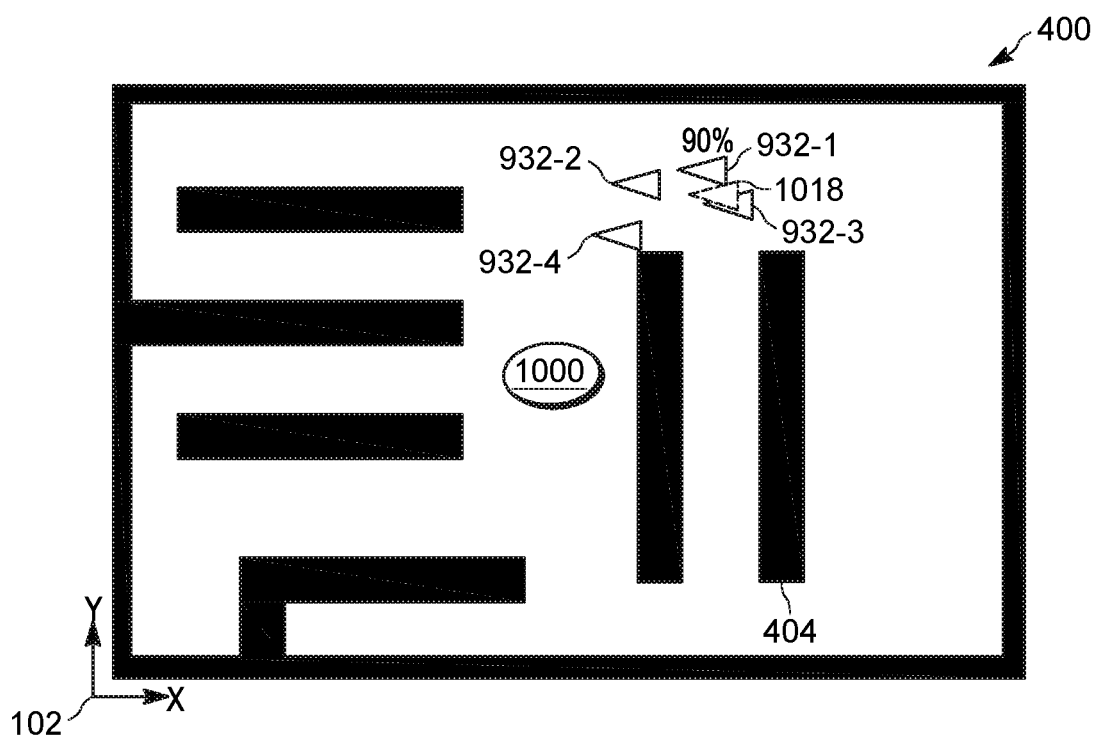

FIG. 10B illustrates the results of a further performance of blocks 315, 320 and 325. As shown in FIG. 10B, the obstacle 1000 has moved, and is no longer in a position to be detected in the observational data from an updated actual pose 1018 of the apparatus 103. The weights generated for the updated candidate poses 932-1, 932-2, 932-3 and 932-4 therefore once again indicate high localization confidence, and a new set of candidate poses can be generated at a further performance of block 310 based on the weights shown in FIG. 10B, resulting in a set of candidate poses tightly biased towards the actual pose 1018 (rather than more weakly biased candidate poses that would result from generating a new set of candidate poses according to the weights shown in FIG. 10A).

Through the performance of the method 300, therefore, the apparatus 103 is configured to resample candidate poses (i.e. generate new sets of candidate poses) when such resampling is expected to yield greater localization confidence than currently available, and to avoid resampling otherwise. In other words, the apparatus 103 retains particle distributions (i.e. does not resample) that have historically yielded higher localization confidence than a current localization confidence (in the event that the current localization confidence is lower due to a transient factor such as a moving obstacle, distorted region of the map, or the like). Further, the apparatus 103 replaces particle distributions that have historically yielded lower localization confidence than a current localization confidence, with the expectation that resampling based on the current elevated localization confidence will lead to further improvements in localization.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for localization of a mobile automation apparatus, the method comprising, at a navigational controller:
   generating a set of candidate poses within an environmental map;
   updating the set of candidate poses according to motion data corresponding to movement of the mobile automation apparatus;
   receiving observational data from a field of view collected at an actual pose of the mobile automation apparatus;
   generating (i) respective weights for the candidate poses, each weight indicating a likelihood that the corresponding candidate pose matches the actual pose, and (ii) a localization confidence level based on the weights; and
   responsive to determining whether the localization confidence level exceeds a candidate pose resampling threshold:
      when the determination is affirmative, (i) increasing the candidate pose resampling threshold and (ii) generating a further set of candidate poses; and
      when the determination is negative, (i) decreasing the candidate pose resampling threshold without generating the further set.

2. The method of claim 1, further comprising:
   presenting a localization of the mobile automation apparatus based on the localization confidence level.

3. The method of claim 1, further comprising:
   prior to generating the set of candidate poses, retrieving the map from a memory.

4. The method of claim 1, wherein updating the set of candidate poses according to the motion data comprises:
   receiving the motion data from a motion sensor of the mobile apparatus; and
   re-locating each of the candidate poses relative to the map based on the motion data.

5. The method of claim 1, wherein receiving the observational data includes receiving depth scan data captured by a depth sensor of the mobile automation apparatus.

6. The method of claim 1, wherein generating the weights comprises:
   determining, based on the map, expected observational data; and
   comparing the expected observational data to the observational data.

7. The method of claim 1, wherein generating the localization confidence level comprises: selecting a subset of the candidate poses, and generating an average of the weights corresponding to the subset.

8. The method of claim 1, wherein decreasing the candidate pose resampling threshold comprises decreasing the candidate pose resampling threshold by a predetermined step value.

9. The method of claim 1, wherein increasing the candidate pose resampling threshold comprises setting the candidate pose resampling threshold to a value equal to a highest one of the weights.

10. A mobile automation apparatus, comprising
    a motion sensor;
    an observational sensor; and a navigational controller connected to the motion sensor and the observational sensor; the navigational controller configured to:
  generate a set of candidate poses within an environmental map;
  update the set of candidate poses according to motion data collected via the motion sensor;
  collect observational data from a field of view corresponding to an actual pose of the mobile automation apparatus via the observational sensor;
  generate (i) respective weights for the candidate poses, each weight indicating a likelihood that the corresponding candidate pose matches the actual pose, and (ii) a localization confidence level based on the weights; and
  determine whether the localization confidence level exceeds a candidate pose resampling threshold, and responsive to the determination:
    when the determination is affirmative, (i) increase the candidate pose resampling threshold and (ii) generate a further set of candidate poses; and
    when the determination is negative, (i) decrease the candidate pose resampling threshold without generating the further set.

11. The mobile automation apparatus of claim 10, wherein the navigational controller is further configured to: present a localization of the mobile automation apparatus based on the localization confidence level.

12. The mobile automation apparatus of claim 10, wherein the navigational controller is further configured to: prior to generating the set of candidate poses, retrieve the map from a memory.

13. The mobile automation apparatus of claim 10, wherein the navigational controller is further configured, to update the set of candidate poses according to the motion data, to:
  receive the motion data from a motion sensor of the mobile apparatus; and
  re-locate each of the candidate poses relative to the map based on the motion data.

14. The mobile automation apparatus of claim 10, wherein the navigational controller is further configured to receive the observational data as depth scan data.

15. The mobile automation apparatus of claim 10, wherein the navigational controller is further configured, to generate the weights, to:
  determine, based on the map, expected observational data; and
  compare the expected observational data to the observational data.

16. The mobile automation apparatus of claim 10, wherein the navigational controller is further configured, to generate the localization confidence level, to:
  select a subset of the candidate poses, and generate an average of the weights corresponding to the subset.

17. The mobile automation apparatus of claim 10, wherein the navigational controller is further configured, to decrease the candidate pose resampling threshold, to: decrease the candidate pose resampling threshold by a predetermined step value.

18. The mobile automation apparatus of claim 10, wherein the navigational controller is further configured, to increase the candidate pose resampling threshold, to set the candidate pose resampling threshold to a value equal to a highest one of the weights.

19. The mobile automation apparatus of claim 10, wherein the motion sensor includes an inertial measurement unit; and wherein the observational sensor includes a lidar sensor.

20. A non-transitory computer-readable medium storing a plurality of computer-readable instructions executable by a navigational controller, wherein execution of the computer-readable instructions configures the navigational controller to:
  generate a set of candidate poses within an environmental map;
  update the set of candidate poses according to motion data collected via a motion sensor;
  collect observational data from a field of view corresponding to an actual pose of the mobile automation apparatus via an observational sensor;
  generate (i) respective weights for the candidate poses, each weight indicating a likelihood that the corresponding candidate pose matches the actual pose, and (ii) a localization confidence level based on the weights; and
  determine whether the localization confidence level exceeds a candidate pose resampling threshold, and responsive to the determination:
    when the determination is affirmative, (i) increase the candidate pose resampling threshold and (ii) generate a further set of candidate poses; and
    when the determination is negative, (i) decrease the candidate pose resampling threshold without generating the further set.

21. The method of claim 1, wherein when the determination is negative, (i) decreasing the candidate pose resampling threshold without generating the further set and (ii) repeating the updating, the receiving, the generating respective weights and the determining.

* * * * *